July 26, 1966 W. R. HICKS ETAL 3,262,358
FOCUSING APPARATUS FOR A MOTION PICTURE PROJECTOR
Original Filed Nov. 29, 1961 3 Sheets-Sheet 1

INVENTORS
WALTER R. HICKS
ADOLPH MENDELSOHN
BY
ATTORNEYS

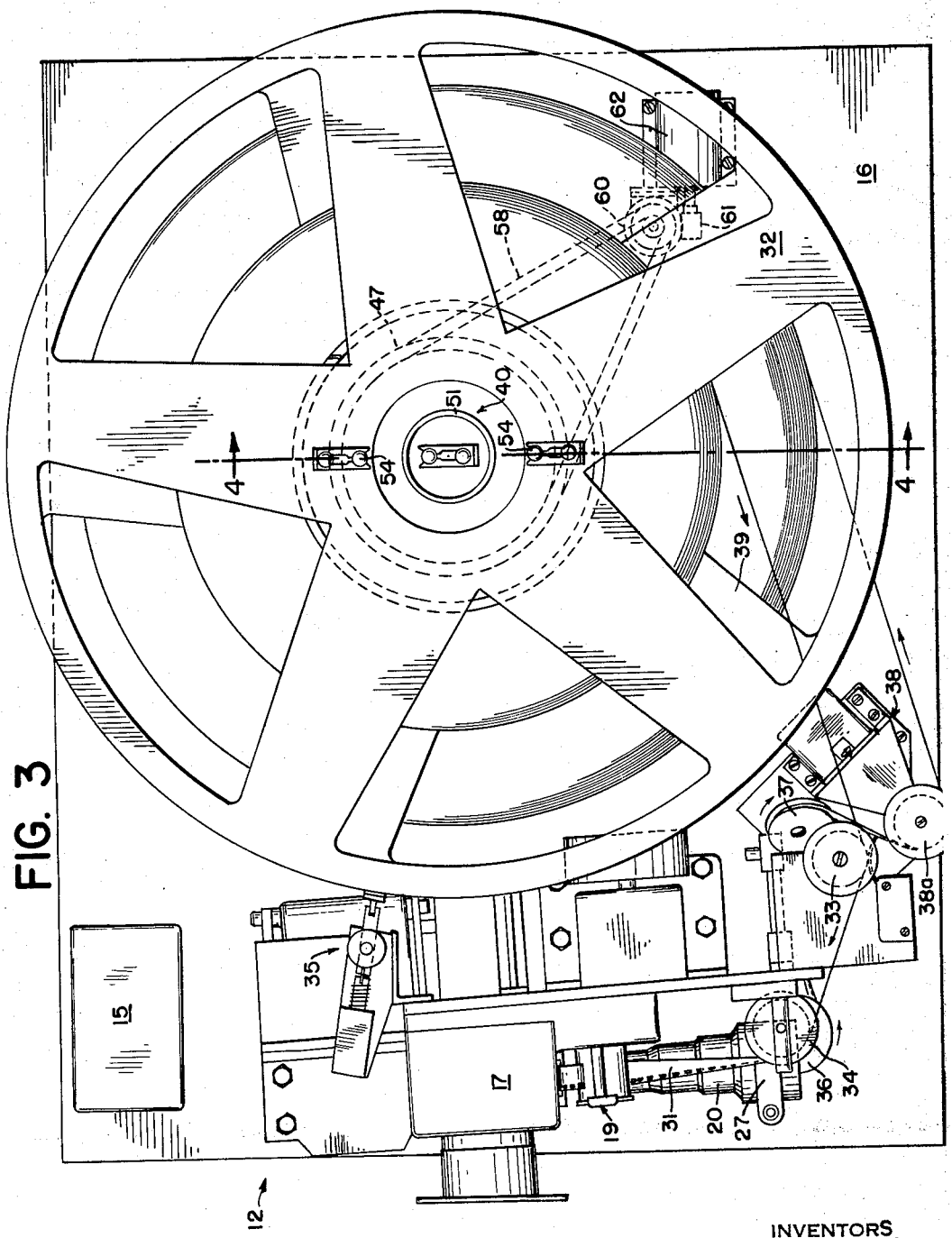

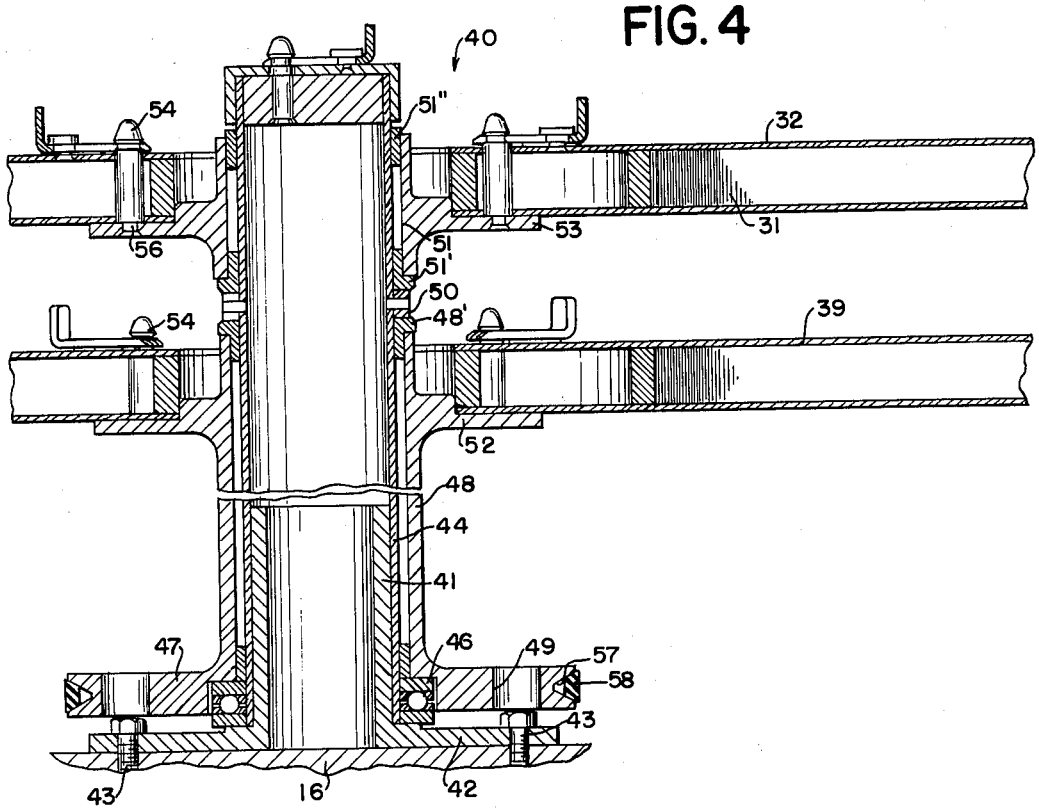

United States Patent Office 3,262,358
Patented July 26, 1966

1

3,262,358
FOCUSING APPARATUS FOR A MOTION
PICTURE PROJECTOR
Walter R. Hicks, Manhasset, and Adolph Mendelsohn,
New York, N.Y., assignors, by mesne assignments, to
Kirkeby-Natus Corporation, New York, N.Y., a corporation of Maryland
Original application Nov. 29, 1961, Ser. No. 155,593.
Divided and this application May 11, 1965, Ser. No. 464,888
2 Claims. (Cl. 88—24)

This is a division of application Serial No. 155,593 filed November 29, 1961, now abandoned.

This invention relates to motion picture apparatus and in particular to certain improvements in the disposition of film take-up and feed reels, in combination with a motion picture projector.

The present invention was devised in connection with the origination of an entire, automatically functioning motion picture projection system to be installed on large passenger aircraft for in-flight motion picture viewing. In accordance with the basic concept and operation of the new system, during flights of sufficient duration, passengers are shown full or feature-length motion pictures, the system being initiated by an electrical control switch available to the pilot, but otherwise completely untended by air crew personnel during viewing.

Not the least among the difficulties inherent in developing the new projection system were those imposed by the space and design limitations of present-day conventional passenger aircraft. It was necessary to install the projector unit, including the supply and take-up reels therefor, in a permanent position which would permit minimum undistorted viewing, without materially altering or disrupting the already compact allocation of space within the interior of the aircraft. The logical placement of the projector unit compatible with available space, required installation of the unit in a flat, overhead compartment, midway or slightly toward the rear of the passenger section. A space-height prerequisite was thus imposed, necessitating the entire projector unit, including reels, mounting frame and other accessories, not to exceed a total height of 12 inches.

Feature films have a total running footage of approximately 5,000 feet, and may in some instances be somewhat greater in length. Since the present system utilizes a single projector and provides for uninterrupted viewing without changing reels, single supply and take-up reels respectively are used having the total film footage capacity mentioned, and are therefore each appproximately 24 inches in diameter. Consequently, conventional methods of mounting supply and take-up reels in relation to the projector would not permit of an installation having the required minimum height.

To solve the foregoing problem and in accordance with the present invention, a projector unit has been devised including a conventional, vertically positioned projector, in combination with large diameter, laterally adjacent film supply and take-up reels. The latter are horizontally disposed and are compactly and coaxially mounted to have collectively an overall vertical dimension which is less than the height of the projector.

More specifically, a frame is provided upon which a

2 projector is mounted, the total height of the projector and frame being no greater than twelve inches. Laterally adjacent to the projector, a single, vertical reel mount is secured to the frame with mounting provisions thereon for receiving coaxially, an upper film supply reel and a lower take-up reel. The top to bottom spacing of the reels is less than the overall height of the projector and in the particular embodiment herein illustrated, is less than one-half the height of the projector. The reel mount is constructed such that the upper supply reel may rotate freely and independently of a driving rotation provided for the lower take-up reel. Advantageously and to assist the compact nature of the projector unit, the supply and take-up reels are relatively closely spaced and are elevated above the projector mounting frame but remain below the height of the projector. This arrangement permits certain of the accessory members of the projector unit, including a drive motor for the take-up reel, to be affixed to the mounting frame of the projector unit beneath the supply and take-up reels. Intermediate each of the reels and the projector, guide rolls are provided for assisting the gradual re-orientation of film from horizontal to vertical dispositions when fed to the projector, and vice versa, from the projector to the take-up reel.

These and other aspects of the invention will become apparent upon examination of the following detailed description of a particular embodiment and the accompanying drawing in which:

FIG. 3 is a plan view of the projector unit; and

FIG. 4 is an enlarged cross-sectional view illustrating the specific structure of the supply and take-up reel mounting means.

Figure 1:
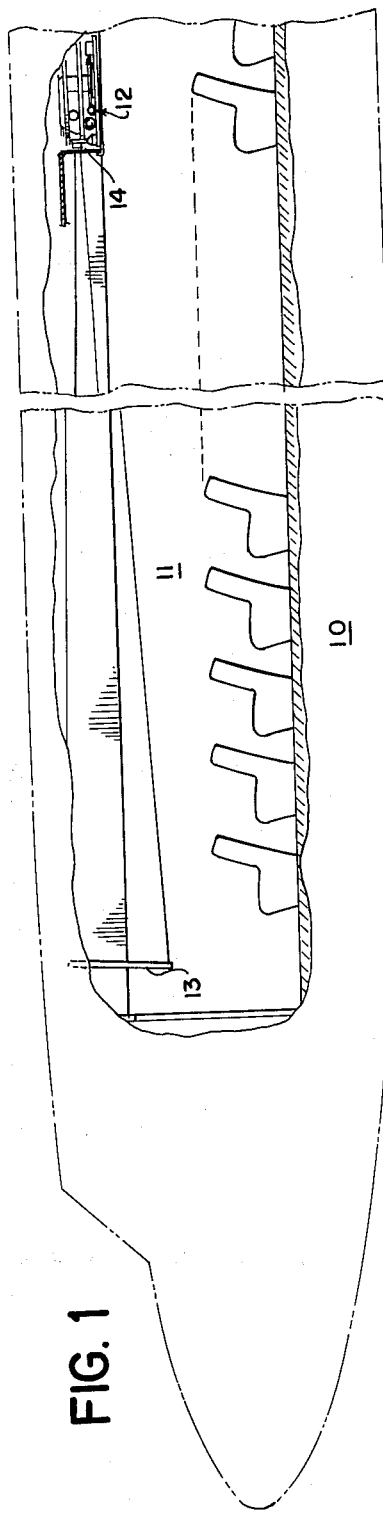
FIG. 1 is a general view showing the installation of the projector unit of the invention in a passenger aircraft.

Referring now to the drawing and initially to FIG. 1 thereof, reference numeral 10 indicates generally the fuselage of a passenger carrying aircraft and numeral 11 designates the passenger compartment thereof. In accordance with the present invention, a fully automatic motion picture projector system is installed within the passenger compartment comprising in part, a projector unit 12. A screen 13 (shown in viewing position) is hinged to the ceiling or overhead of the compartment 11 forwardly of the projector unit. At times other than during the showing of films, the screen 13 may be swung upwardly against the overhead and secured thereto for storage.

The projector unit 12 is mounted within a flat overhead compartment 14 situated generally centrally of the compartment 11. In the particular embodiment, the compartment 14 may accommodate a projector unit having an exterior shape or envelope approximately 12 inches in height and 30 inches square. The film supply reel of the projector unit will carry the entire footage of a full length feature film so that the showing will be continuous. The operation of the unit 12 is controlled remotely by a cockpit switch (not shown), but otherwise may remain entirely untended during the entire performance.

Figure 2:
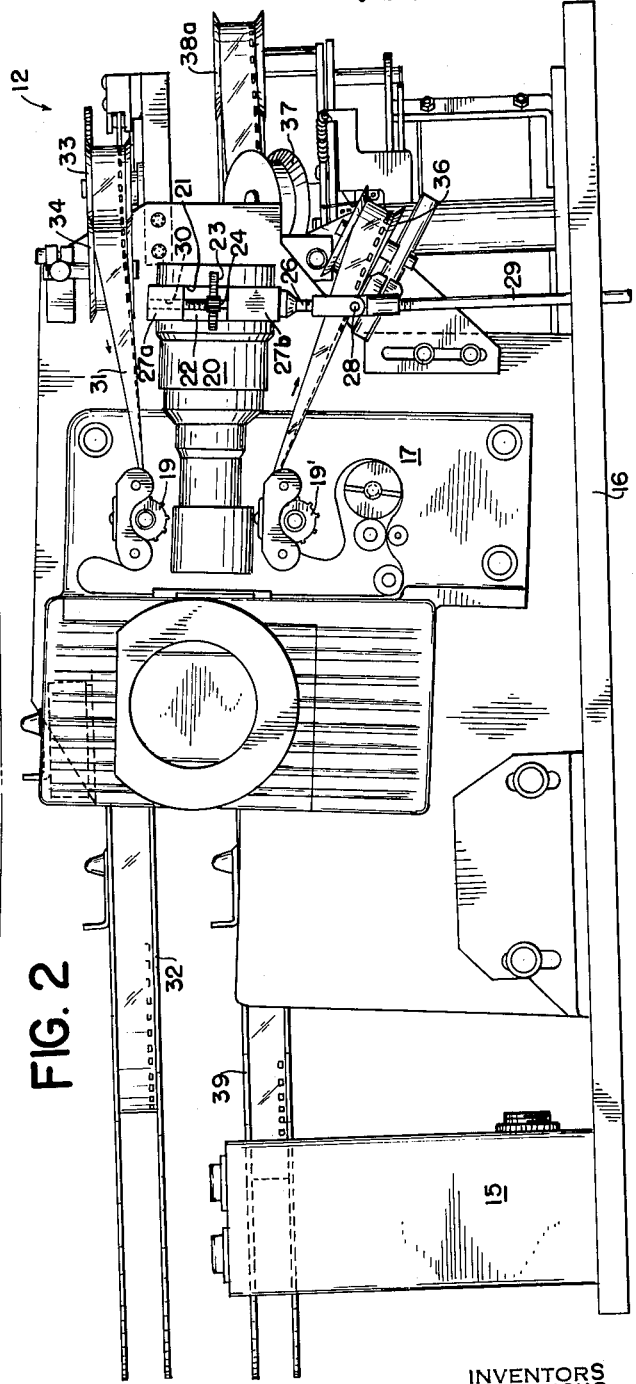
FIG. 2 is a side elevation of the projector unit.

As shown in FIGS. 2-3, the projector unit 12 includes a horizontal mounting frame member 16 of lightweight honey combed aluminum construction, which is approximately 30" x 30". Each of the members of the projector unit (for example, the audio amplifier 15) is mounted upon the frame for package installation of the unit into the compartment 14 of the aircraft. Securely bolted in upright fashion to the frame 16 is a projector 17 whose height together with the frame 16 does not exceed 12 inches. The projector, except for the focusing mechanism described immediately following, is of conventional design and includes film feed and return sprockets 19, 19'.

The projector 17 includes a multi-diametered cylindrical lens holder 20. The holder 20 encloses an internally slidable lens mounting sleeve 22, exterior wall portions of which are exposed through a cutout 21 in the holder 20. The sleeve is affixed to a rack 23 slidable therewith with respect to the holder parallel to the projection axis. A shaft 26 is rotatably journalled in the lower arm 27b of a clamping block 27 and is also permitted limited slidable movement with respect thereto. The block 27, including the upper and lower arms 27a, 27b respectively thereof encompasses the sleeve 22 within the cutout 21 to prevent translatory movement of the block 27 respective of the holder 20. A pinion 24 is affixed to the shaft 26 for rotation therewith, and by means of the slidable movement of shaft 26, may selectively be brought into engagement with or disengagement from the rack 23.

The shaft 26 is provided with a coupling 28 and an extension 29. The coupling 28 permits hinged movement of the lever 29 in rotating the shaft 26. In the arrangement shown, with the pinion 24 in engagement with the rack 23, rotation of the shaft 26 will cause translatory movement of the lens mounting sleeve 22 and thus focusing adjustment.

The shaft 26 is, as mentioned, permitted limited slidable movement respective of the clamping block 27 such that the threaded upper end thereof may enter a threaded bore 30 in the upper arm 27a. When the shaft 26 has entered the bore 30 disengagement of the pinion 24 and the rack 23 will occur. Interior surface portions of the clamp 27 are normally in slidable engagement with the movable lens sleeve 22, within the cutout 21. The arrangement is such that upon threaded engagement of the shaft 26 in the arm 27a, and upon further rotation of shaft 26, the block 27 will be brought into engagement with the movable lens sleeve 22 to secure the focusing adjustment permanently against vibration or other disturbance during a performance.

As will be seen with reference to FIGS. 2 and 3, motion picture film 31 is fed from a horizontal supply reel 32 to guide rolls 33 and 34 thence to the feed sprocket 19 of the projector. From the output sprocket 19' of the projector, the film is fed to guide rolls 36, 37, to a tension sensing device 38, including the roll 38a, and to a lower horizontally disposed take-up reel 39. The tension sensing device 38 is described in detail in the co-pending application Serial No. 155,592 filed November 29, 1961 now Patent No. 3,118,629.

The supply and take-up reels 32 and 39, respectively are mounted coaxially and laterally adjacent to the projector 17. Each of the reels 32, 39 is disposed horizontally and as illustrated, the total height included by the reels is somewhat less than one-half of the total height of the projector. By disposing of the reels thus horizontally, the overall height of the projector unit is maintained at a minimum. It is a function of the respective guide rolls intermediate the reels 32 and 39 and the projector, at least in part, to re-orient the film 31 as it passes respectively to and from the projector and the reels, from the horizontal disposition of the film when wound upon the reels to the vertical disposition thereof as it passes through the projector. A manually operated spring-loaded brake 35 is mounted adjacent the supply reel to engage against the periphery thereof when the projector is not in use. The brake will at other times be disengaged from the reel 32.

As disclosed in FIG. 4, the reels 32, 39 are each mounted coaxially upon a reel mount 40. The mount 40 comprises an inner stub shaft 41, having a base mounting flange 42 which is appropriately secured by bolts 43 to the frame 16.

The shaft 41 is rigidly attached to an outer cylindrical member 44. At the lower end of shaft 41 and supported by a portion of the base flange 42, is a thrust bearing 46. Secured to the upper race of bearing 46 is a rotatable shaft 48. The upper end of the shaft 48 is secured to a friction bearing 48'. A second rotatable shaft 51 is in coaxial relation to the shaft 48 and is rotatable independently thereof. The lower end of the shaft 51 is secured to a friction bearing 51' which rests upon and is supported during rotation by a collar 50 pinned to the stationary shaft 44. The upper end of shaft 51 is attached to a bearing member 51'' which slidably engages the shaft 44. Each of the shafts 48 and 51 includes mounting flanges 52, 53 for holding respectively, the take-up reel 39 and the supply reel 32. Each of the flanges is provided with locating pins 54, the lower ends thereof being fitted into openings 56 in the flanges 52 and 53. The reels have cooperating apertures to prevent rotation of the reels with respect to the mounting flanges.

A pulley 47 is integrally connected to the lower portion of the take-up reel shaft 48. Openings 49 in the body of the pulley permit access to the bolts 43. A conventional V-shaped groove 57 is formed in the periphery of the pulley 47 for the reception of a drive belt 58. As best seen in FIG. 3, the belt 58 completes its passage around a smaller pulley 60, whose periphery has a plurality of gear teeth. These are in meshing engagement with a worm 61 driven by an electric motor 62. Consequently, rotation of the motor 62 will cause rotation of the sleeve 48 and the take-up reel 39. In the particular embodiment, the motor is a 24 volt 400 cycle 3 phase motor whose output speed is 7000 r.p.m. The worm 61 together with pulleys 60 and 47 effect a 300:1 reduction in speed of the take-up reel 39. The speed of the reel 39 may be further varied by the tension device 38 as described in the aforementioned co-pending application Serial No. 155,592 now Patent No. 3,118,629.

It will be noted that the take-up reel 39 is elevated sufficiently above the frame 16 to permit the installation of the drive motor 62 beneath the reel 39. Portions of other parts of the unit such as the film tension mechanism 38 and parts of the projector itself may therefore conveniently project beneath the lower of the two reels, to save space.

The significance of the described reel and projector arrangement will be seen in proper perspective when it is realized that each of the reels 32 and 39 have a diameter of approximately 24 inches in order that each may accommodate the total footage of a full length feature film. In the disclosed arrangement the reels are mounted laterally adjacent to the projector 17 and being horizontal, need not increase the overall height of the projector unit 12. In fact, the height of the unit is determined only by the height of the projector itself. Consequently, a compact projector unit is achieved capable of providing continuous full-length motion picture performances and which can easily be installed in a shallow overhead compartment in the passenger section of an aircraft without reducing headroom therein.

It will be understood that the foregoing description relates to a particular embodiment and is merely representative. In order to understand fully the spirit and scope of the invention, reference should be made to the appended claims in which:

We claim:
1. A focusing apparatus for a motion picture projector comprising a fixed lens mount member, a lens carrying sleeve slidable within said fixed member along a projection axis, aperture means defined by said fixed member exposing a portion of said movable sleeve, clamp means disposed in said aperture means and held axially therein by said member, said clamp means being free to move within the aperture against the movable sleeve to secure said sleeve, a shaft connected to said clamp means, means for moving said clamp means into engagement with said movable sleeve upon rotation of said shaft, and gear means on said shaft and said movable sleeve for moving said sleeve along said projection axis upon rotation of said shaft when said clamp is disengaged from said movable sleeve.

2. A focusing apparatus according to claim 1 in which the clamp means comprises a member of generally C-shaped construction having upper and lower arms, means in one of said arms for journalling said shaft for rotation and for slidable movement relative thereto, the other of said arms defining a threaded bore for the reception of a correspondingly threaded end portion of said shaft, the slidable movement of said shaft permitting entry of the threaded end thereof into said bore, means on said shaft cooperating with the arm journalling said shaft for effecting movement of said arms towards each other upon continued rotation of said shaft when in threaded engagement with the other of said arm rack gear attached to the lens carrying sleeve for engagement with said pinion when the threaded end of the shaft is withdrawn from said threaded bore, said pinion being disengaged from said rack gear when the end of said shaft is threadably engaged with said clamp.

References Cited by the Examiner
UNITED STATES PATENTS

| | | | |
|---|---|---|---|
| 830,820 | 6/1903 | Bausch | 88—24 X |
| 2,482,629 | 9/1949 | Little | 95—45 X |
| 2,506,948 | 5/1950 | Wienke | 88—24 |
| 2,571,804 | 10/1951 | Wittel et al. | 88—24 |
| 3,088,370 | 5/1963 | Erke et al. | 88—24 |

FOREIGN PATENTS

| | | |
|---|---|---|
| 552,371 | 4/1943 | Great Britain. |

NORTON ANSHER, *Primary Examiner.*

V. A. SMITH, *Assistant Examiner.*